Sept. 23, 1969  R. I. JUDD  3,468,582
AIRLINE PASSENGER SEAT
Filed Dec. 4, 1968  5 Sheets-Sheet 1
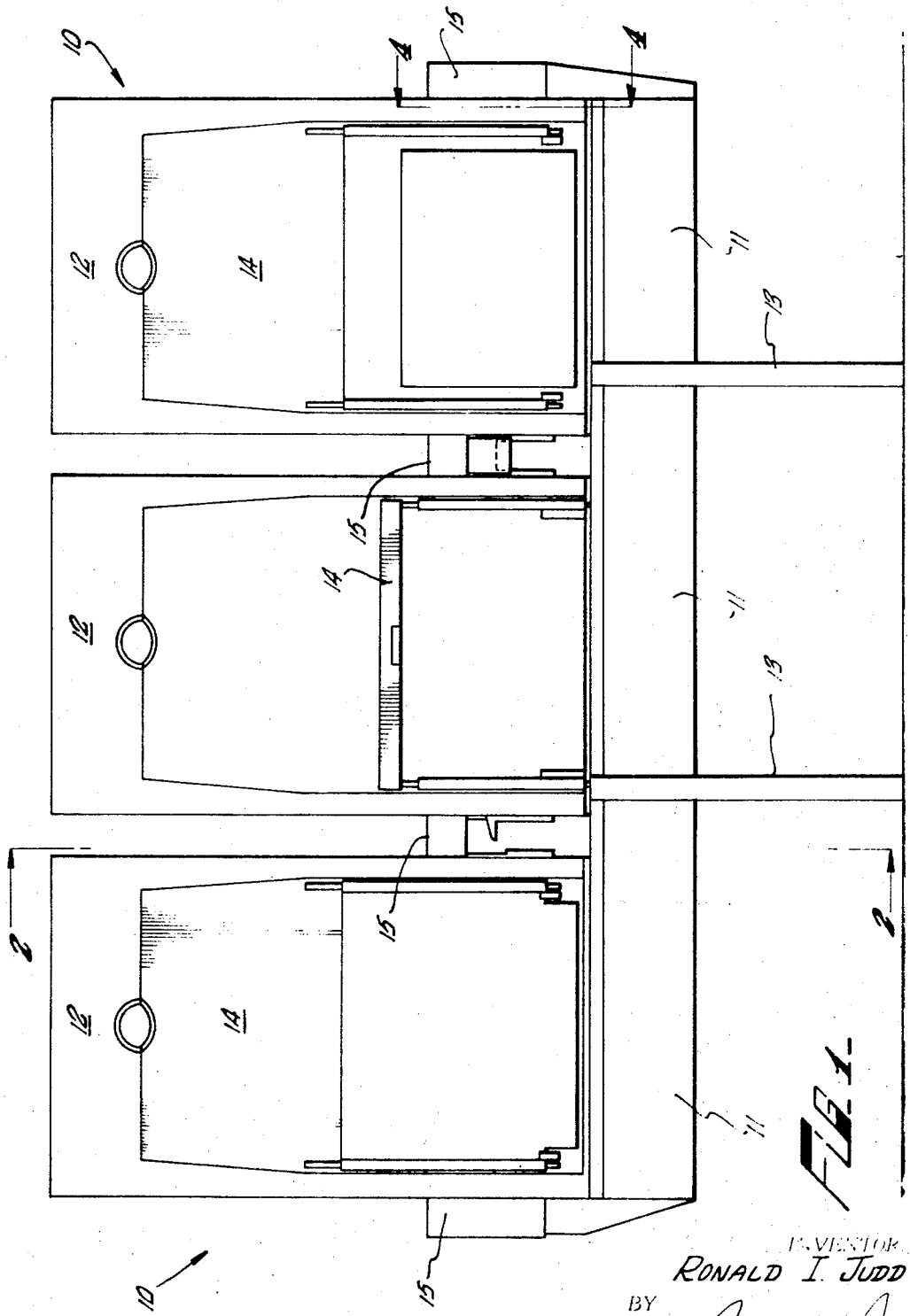

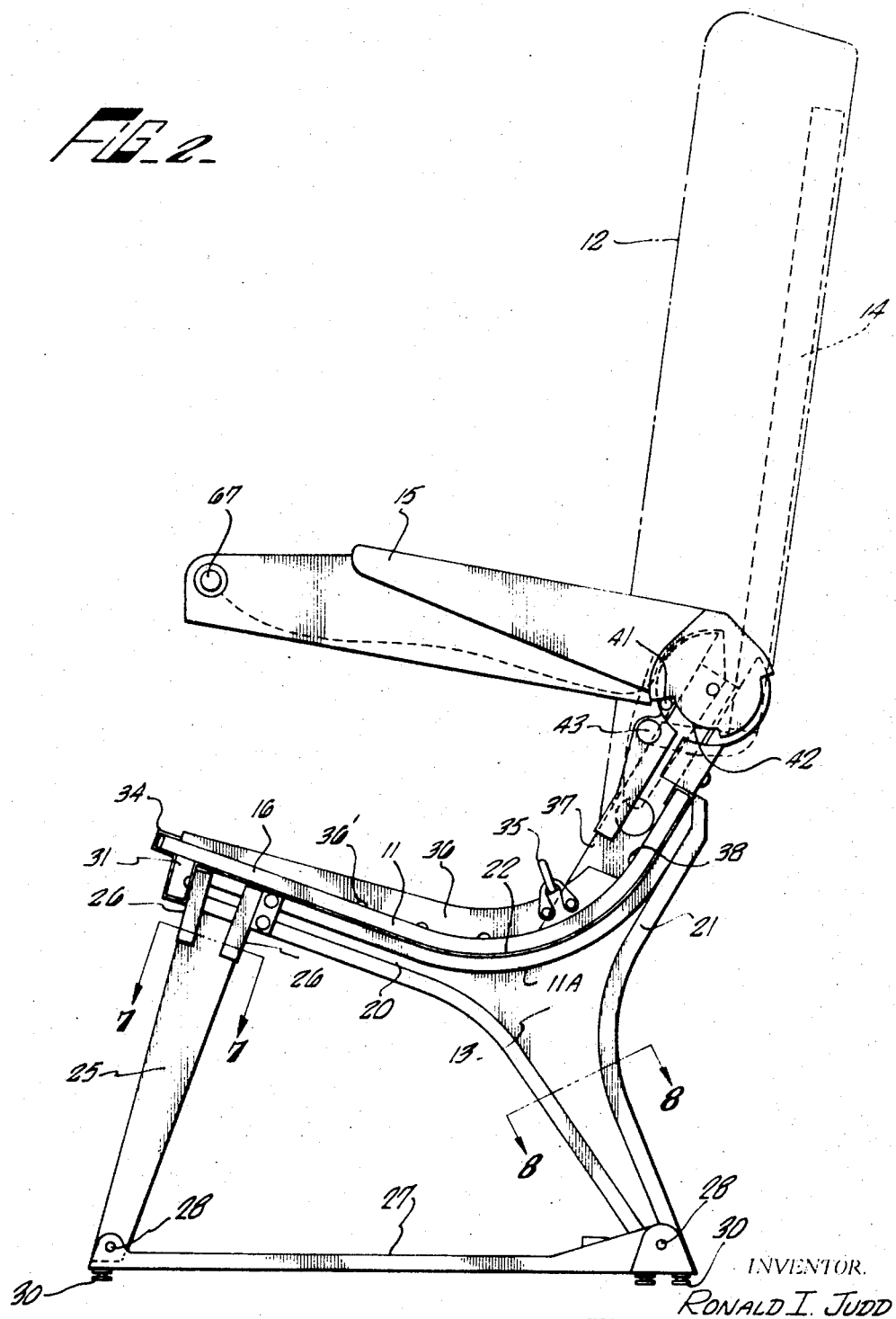

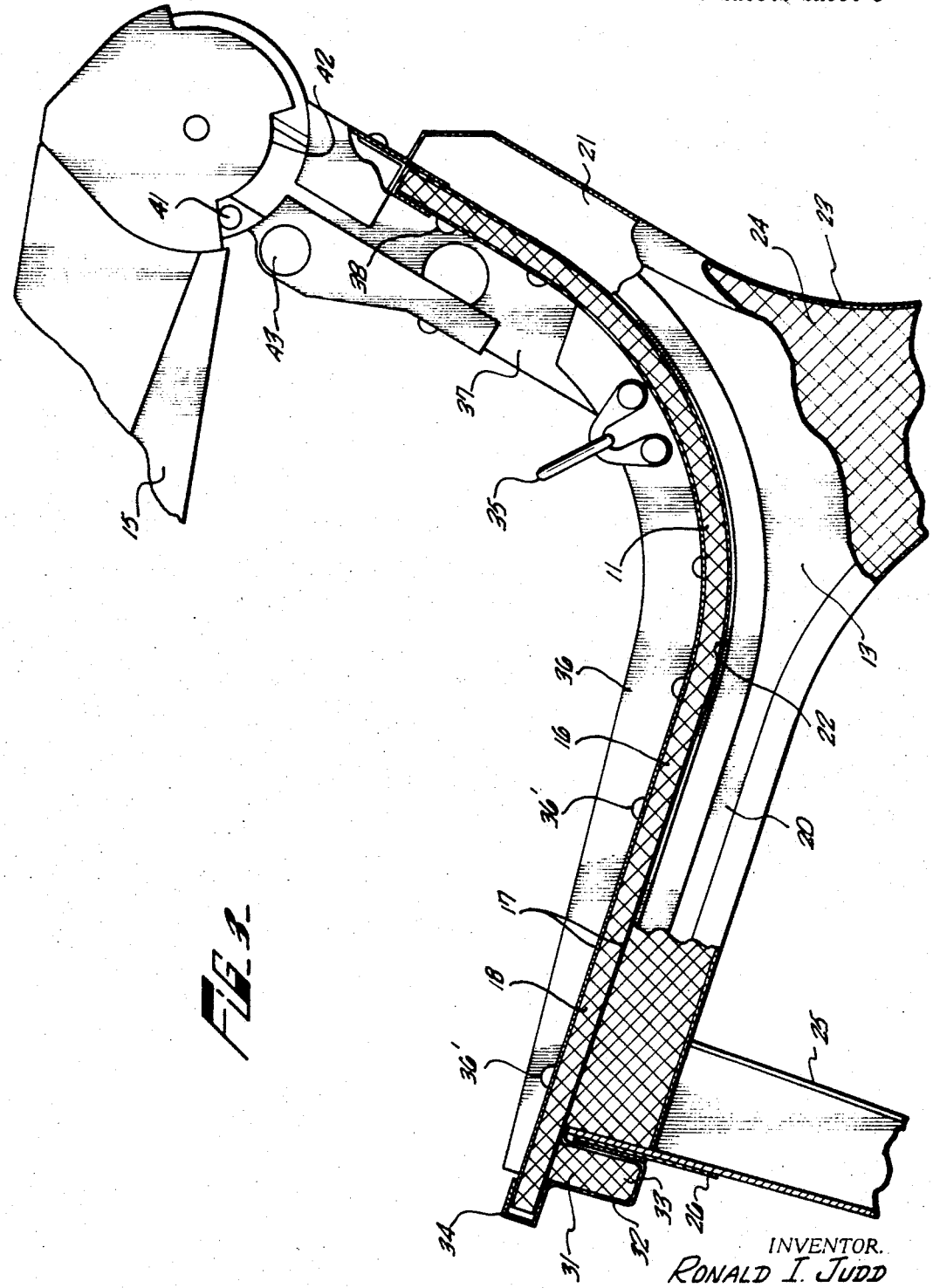

INVENTOR.
RONALD I. JUDD
BY Jackson & Jones
ATTORNEYS

Sept. 23, 1969   R. I. JUDD   3,468,582
AIRLINE PASSENGER SEAT
Filed Dec. 4, 1968   5 Sheets-Sheet INVENTOR.
RONALD I. JUDD
BY
Jackson & Jones
ATTORNEYS

2

United States Patent Office 3,468,582
Patented Sept. 23, 1969

3,468,582
AIRLINE PASSENGER SEAT
Ronald I. Judd, Anaheim, Calif., assignor to Henry Engineering Company, Anaheim, Calif., a company of California
Filed Dec. 4, 1968, Ser. No. 781,036
Int. Cl. A47c 5/00, 1/024
U.S. Cl. 297—445                                      13 Claims

ABSTRACT OF THE DISCLOSURE

An airline passenger seat is described having contoured seat and back portions of honeycomb sections sandwiched between two sheets of lightweight metal. The seat is supported by Y-shaped saddle members which also may be made of a sandwiched honeycomb construction. The back portion pivots about the back side of the seat portion at an axis higher than normal to provide increased leg room, passenger safety and comfort.

BACKGROUND OF THE INVENTION

Field of the invention

This invention relates to airline passenger seats and more particularly to an improved seat construction to provide greater strength, safety and comfort.

Description of the prior art

Heretofore, airline seats commonly in use have generally been constructed of two pieces, i.e. a seat portion, rigidly mounted on four legs, and an upright back portion, pivotally mounted to the back side of the seat portion. The seat portion usually comprises a rectangular metal frame structure having its top surface cushioned and covered. The back portion also consists of an elongated metal frame having a covered cushion contoured to comfortably support the occupant's back.

Although widely used, prior airline seats have suffered from various shortcomings that have hampered their acceptance by the airline industry.

One of the major problems encountered in the use of conventional airline seats is the safety hazard which exists in certain instances when the aircraft is forced to make a crash landing. During such accidents, it is quite common for airline passengers to be hurdled forward from their seats and collide with the back of the seats immediately before them. Unfortunately, the lower backs of these seats are rigid and do not provide any means to absorb the impact of the passengers during such collisions. Furthermore these seats are usually provided with a rear beam located beneath the seats between the two rear support legs. Such beams also are dangerous during a crash landing and can cause severe damage to the passengers legs during impact. It has been determined that in a number of plane crashes, there was sufficient time to evacuate the plane before it was engulfed in flames, but many passengers could not move under their own power because of broken legs suffered from colliding with the backs of the airline seats. As a result, many casualties and fatalities have occurred because of the present airline seat construction.

Another problem encountered by prior airline seats is their lack of comfort. The seat portions are usually flat and hard while the back portion pivots about an axis adjacent the back edge of the seat portion which is too low to give proper support to the lumbar area of the passenger's body when the back portion is reclined.

Another ever-present problem with the aircraft industry is the constant struggle to reduce the weight of an aircraft without sacrificing safety. Because of their bulky metal frame construction, the prior airline seats contribute largely to the total weight of the aircraft since seats are the most numerous large commodity on the aircraft.

SUMMARY OF THE INVENTION

This invention obviates the above-mentioned problems by providing an airline passenger seat having a contoured seat portion of a sandwiched honeycomb construction. The seat also includes a contoured back portion of similar construction that pivots about an axis adjacent the lumbar area of the passenger to provide increased passenger leg room and greater lumbar support. The seat support comprises a pair of Y-shaped saddles having an upper surface contoured to receive the bottom surface of the seat portion. The saddles are also made of a sandwiched honeycomb construction for added strength and reduced weight. The back portion is pivotally mounted on the seat portion by hinge means that are attached to the seat portion over a large surface thereof to evenly distribute the loads transferred by the back portion over a wide area of the seat portion.

The invention thus provides an airline passenger seat that is frangible on impact to absorb the energy caused by a collision with a passenger. The invention also provides an airline passenger seat having a contoured seat and back portions for greater comfort and better body support.

The features of the present invention which are believed to be novel are set forth with particularity in the appended claims. The present invention, both as to its organization and manner of operation, may best be understood by reference to the following description taken in connection with the accompanying drawings.

BRIEF DESCRIPTION OF THE DRAWINGS

FIGURE 1 is a rear plan view of a single row of seats in accordance with the present invention;

FIGURE 2 is a side plan view of an airline seat taken along lines 2—2 of FIGURE 1, with the back portion shown in broken lines and the seat portion shown without the covered cushion;

FIGURE 3 is an exploded plan view of the seat portion with a portion of the support structure shown in section;

DESCRIPTION OF THE PREFERRED EMBODIMENT

Figure 5:
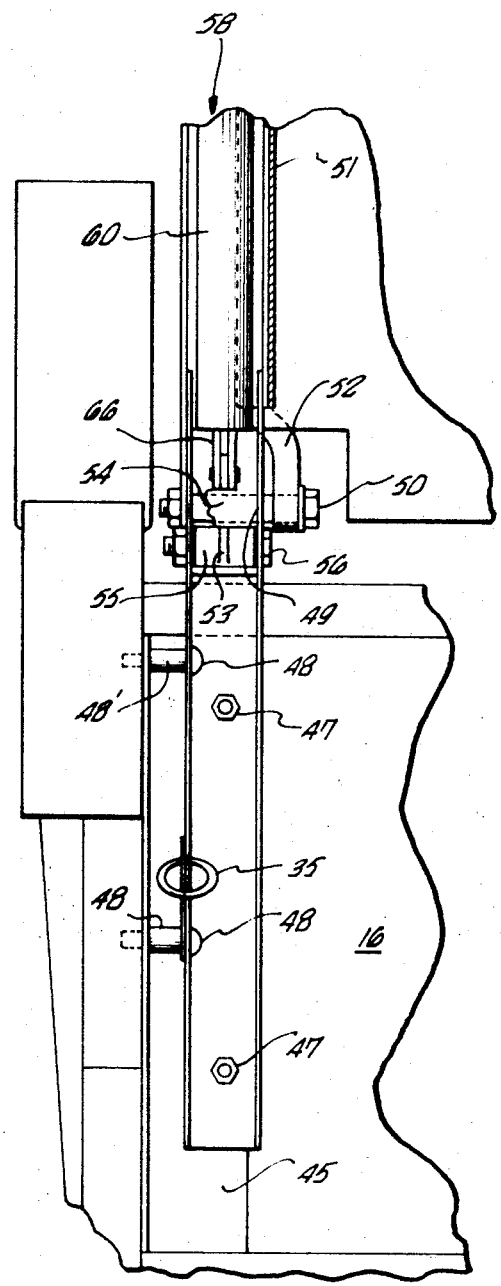
FIGURE 5 is an exploded fragmentary view of the hinge means taken along lines 5—5 of FIGURE 4.

Referring now to the drawings, FIGURE 1 shows a single row of airline passenger seats, each generally shown at 10. Each of the seats 10 includes a seat portion 11 and a back portion 12. The seat portions 11 are all integral and are supported as a unit by a pair of saddles 13. The absence of any rear beam extending across the row directly below the seat portions 11 should be noted. The pair of saddles 13 are adequate to support the rear end of the seats 10. Such positioning allows more leg room particularly at the ends of the row, which also permits a roomier access to the seats from the aisles. Furthermore, the absence of the rear beam eliminates a safety hazard in that the passengers seated behind the row have no beam to collide with should they be thrown against the backs of the seats directly before them.

A food tray 14 is adapted to lie flush against the rear of each back portion 12 (as shown on the outer seats) or to pivot forward when in use (as shown on the middle seat).

Located on each side of the seats is an armrest 15, the interior ones of which are pivotally mounted on the seat portion 11.

As shown in FIGURES 2 and 3, the seat portion 11 includes a panel 16 comprising a pair of sheets of metal 17, preferably aluminum, with a section of honeycomb 18 sandwiched therebetween. The honeycomb 18 may be of any lightweight material, with cardboard paper or plastic being preferred. The panel 16 is contoured to comfortably support the passenger by providing for an increasing slope toward the back side thereof.

Figure 8:
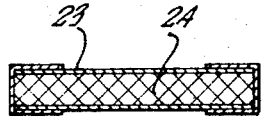
FIGURE 8 is a cross-sectional view of the base portion taken along lines 8—8 of FIGURE 2.

The saddle 13 includes a pair of arms 20 and 21 integrally forming an upper contoured surface 22 for receiving the panel 16. As shown by FIGURES 3 and 8, the saddle 13 is also constructed of an outer skin of metal 23 enclosing a section of honeycomb 24.

Figure 7:
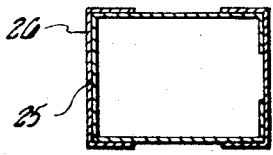
FIGURE 7 is a cross-sectional view of the seat leg taken along lines 7—7 of FIGURE 2.

The forward section of the panel 16 is supported by legs 25 which are rigidly connected to the forward end of the arm 20 by a pair of braces 26. As shown by FIGURE 7, each leg 25 is made of a box construction for added strength with a minimum of weight.

As shown in FIGURE 2, each saddle 13 and leg 25 are connected to a base 27 by means of pins 28. Projections 30 are provided at the bottom of the base 27 for insertion into floor sockets for anchoring purposes.

The front end of the seat portion 11 is provided with a cross beam 31 extending the entire width therefore for added strength to the structure. The cross beam 31 also comprises an outer skin 32 enclosing a section of honeycomb 33. The upper end of the skin 32 forms a flange 34 which is adapted to be attached to the front end of the panel 16.

Ring fasteners 35 are longitudinally spaced along the seat portions 11 on both sides of each to provide securing means for seat belts (not shown). Each ring fastener 35 is attached to an elongated metal rib 36 which is connected to the panel 16 by means of bolts 36' spaced longitudinally along the rib 36 to evenly distribute the loads acting on the ring fasteners 35 over a wide area of the panel 16. It should be noted that FIGURES 2 and 3 show the interior sides of the airline seats and that the rib construction 36 is slightly different than that located on the outer sides of the seats, which will be described in greater detail hereinafter.

Referring again to FIGURES 2 and 3, an upright post 37 is also located on the interior sides of the seat portions 11 and is connected to the panel 16 by bolts 38. The upper end of each post 37 pivotally supports the armrest 15 in a conventional manner. A pin 41 is located on the post 37 and forms a stop which is adapted to engage either end of a cam 42 on the inner end of the armrest 15 to limit the travel thereof.

Figure 4:
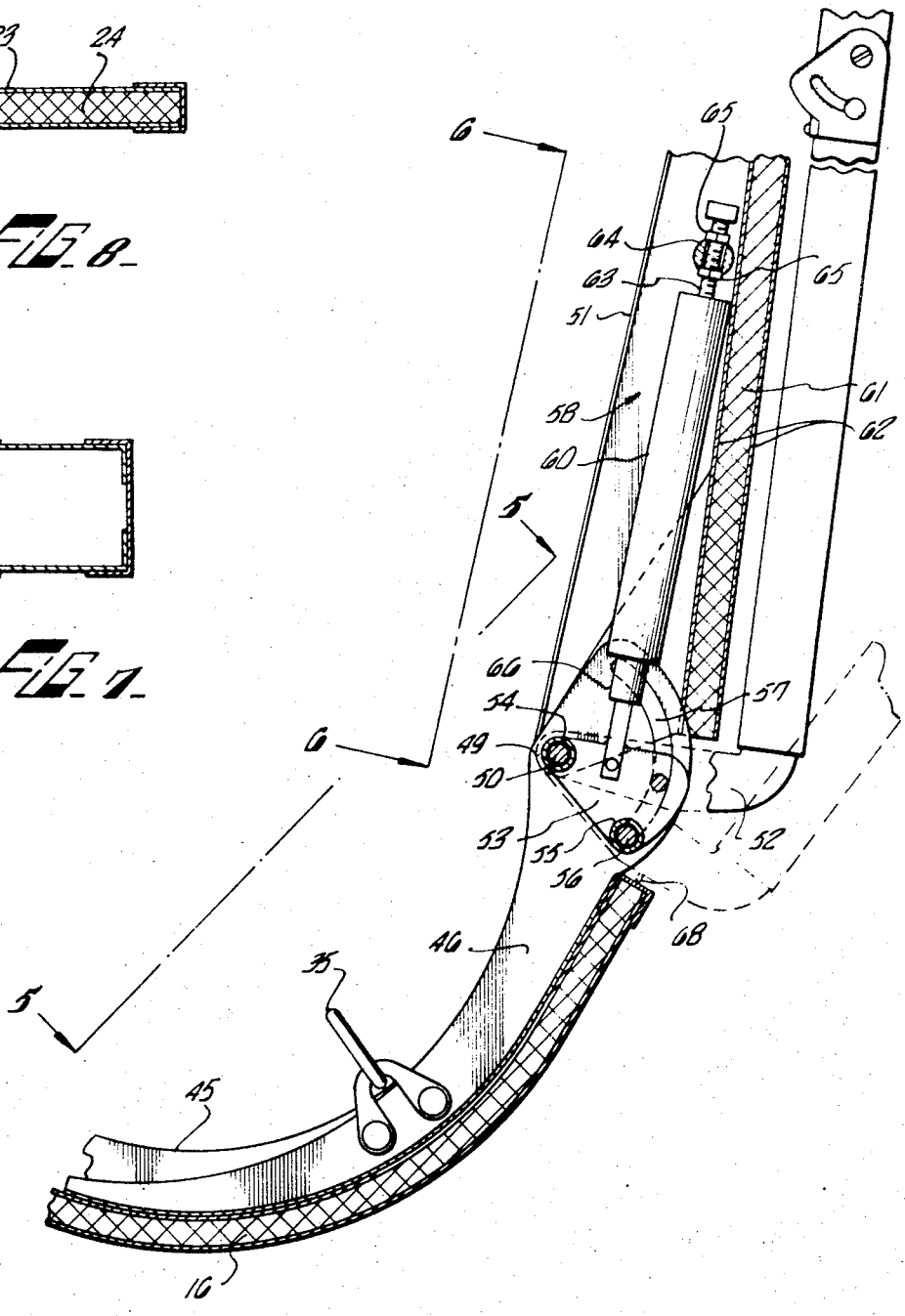
FIGURE 4 is a fragmentary plan view, partly in section, of the hydraulically actuated hinge means taken along line 4—4 of FIGURE 1.

The back portion 12 is also constructed of a section of honeycomb 61 sandwiched between two sheets of lightweight metal 62 (see FIGURE 4). The contour of the covered cushion is shown in broken lines. The back portion 12 and the food tray 14 both are pivotally connected to the post 37 by means of a pin 50.

It should be noted that the back portion 12 is pivoted about an axis which is adjacent or within the lumbar area of the passenger. The pivot axis is preferably located more than sixteen inches above the floor to which the seat is secured and within the range of seventeen to twenty inches above the floor. The lowermost portion of the seat 11A which receives the passengers' buttocks is approximately ten inches above the floor. The pivot axis of back portion 12 is substantially higher than that utilized in prior airline seats, wherein the pivot axis is below the lumbar area of the passenger. The high pivot axis in combination with the seat portion which slopes upwardly as it approaches the back side of the seat provides several distinct advantages over the prior art. First, greater leg room is provided between adjacent seats. This permits a higher packing density of the seats or greater passenger comfort, or both. Second, the combination eliminates rigid support members, such as bars, adjacent the back side of the seat, which rigid support members provide a potential hazard to the passengers' legs during crash landings. Third, the combination provides a greater support to the lumbar area of the body, especially when the back portion is in its reclined position. Fourth, the combination including the use of a honeycomb construction for the seat provides a frangible barrier in front of the passengers' legs. This reduces the tendency for the passengers to break their legs during crash landings, thereby increasing the margin of passenger safety.

Figure 6:
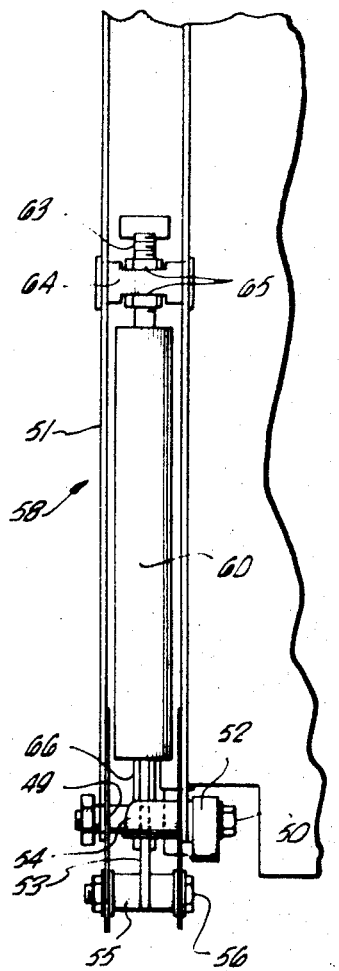
FIGURE 6 is an exploded fragmentary view of the hinge means taken along lines 6—6 of FIGURE 4.

FIGURES 4–6 shows the support structure for the outer sides of the airline seats. The fixed armrest 15 is rigidly mounted on the seat portion 11 facing the aisles.

An L-shaped bar 45 is also rigidly connected to the panel 16 by bolts (not shown). Such a bar serves as a reinforcing member for the outer end of panel 16.

Mounted on the bar 45 is a U-shaped channel 46 which is secured thereto by bolts 47 and 48 with spacer sleeves 48' located on the bolts 48. A ring fastener 35 is shown anchored to one side of the channel 46 for seat belt attachments.

The upper end of the channel 46 includes a pair of apertures 49 for receiving the pin 50 which serves as a pivot means for the back portion 12 and the food tray 14. The back portion 12 also includes a U-shaped channel 51 rigidly attached thereto with its lower end pivotally connected to the pin 50. The food tray 14 is pivotally connected to the inner end of the pin 50 by means of an arm 52. See FIGURE 5.

A triangular plate 53 is also pivotally mounted on the pin 50 by means of a cylindrical sleeve 54 integrally connected thereto. The other end of the plate 53 also integrally forms a cylindrical sleeve 55 for receiving a bolt 56. The extremities of the bolt 56 extend into an arcuate slot 57 formed on the channel 46.

Hydraulic locking means, generally shown at 58, includes a cylinder 60 having its upper end pivotally connected to the channel 51 by means of a threaded bolt 63 extending through pin means 64. A pair of nuts 65 are threaded onto the bolt 63 on both sides of the pin means 64 to serve as adjustment means for varying the effective length of the locking means 58. A piston 66 is axially movable within the cylinder 60 and extends out of the lower end thereof for attachment to the plate 53. Hydraulic means (not shown) are hydraulically connected to the interior of the cylinder 60 in the conventional manner, and are controlled by a button 67 located on the armrest 15, again in a conventional manner.

The back portion 12 is shown in FIGURE 4 in its upright position. If the passenger wishes to move the back portion 12 to a reclining position, the hydraulic lock 58 is hydraulically actuated to move the piston 66 upward to shorten the effective length of the lock 58 thereby permitting the back portion to recline backwards. The reverse operation is similar. To return the back portion to its upright position, the hydraulic means, controlled by the button 67, moves the piston 66 downward to lengthen the effective length of the hydraulic lock 58, thus pivoting the back portion 12 forward. It should be noted that a number of reclining positions are possible with such locking means.

The arcuate slot 57 is provided to permit the back portion 12 along with the locking means 58 to pivot forward to a substantially horizontal position for stowing purposes.

As stated previously, the food tray 14 also pivots about the pin 50 by means of the arm 52. The stowed position of the food tray 14 is shown in solid lines in FIGURE 4 while its operable position is shown in broken lines. A pin 68 is located on the arm 52 to serve as a stop for engaging the panel 16 to limit the downward movement of the food tray 14.

An important advantage of the sandwiched honeycomb construction is its inherent torsional and bending rigidity for strength combined with the quality of being frangible on impact should a person be hurled against it during a crash or collision.

Thus, the airline seat in accordance with the present invention ensures passenger comfort by providing a rigid contoured cushion support with increased slope with the higher than normal back pivot point providing greater lumbar support at recline. The seat further provides strength and safety combined with lightweight construction. The contoured bottom structure improves shin clearance by eliminating a rear beam. The front of the seat projects upwardly at an angle of approximately 20° with the horizontal plane, while the back side of the seat projects upwardly at an angle of approximately 60° with the horizontal plane, thereby providing an included angle of 100°. Finally, this simple concept provides for a reduction in the number of parts, thereby enhancing its maintainability. Various modifications of the airline seat will be apparent to those skilled in the art without involving a departure from the spirit and scope of my invention.

What is claimed is:

1. A lightweight seat for passengers of vehicles adapted for airborne flight comprising:
   an integral seat-lumbar supporting surface and rigid seat frame both commonly defined by a planar structure having rigid outer skins separated by a honeycomb material, said planar structure provides a substantially horizontal seat surface which integrally continues via an upward curve into a lumbar supporting surface, and the curved planar structure itself further provides a rigid frame of high torsional and bending rigidity to support the weight of a passenger seated on the seat-lumbar supporting surface thereof; and
   means for supporting said planar structure at seat height above the floor of the vehicle.

2. A seat in accordance with claim 1 and further comprising:
   an integral backrest surface and rigid backrest frame extending upwardly from the lumbar supporting surface and comprising a planar structure having rigid outer skins separated by a honeycomb material.

3. A seat in accordance with claim 2 wherein said seat portion forms an included angle with a plane parallel to the floor of approximately 20° and the lumbar and/or extending backrest portion thereof form an included angle of approximately 60° with said plane.

4. A seat in accordance with claim 2 and further comprising means pivotally connecting the backrest portion to the lumbar supporting surface about a horizontal axis adjacent the upper lumbar area of a passenger seated on the seat.

5. A seat in accordance with claim 4 wherein said pivotal connecting means comprises pivot means secured to opposite sides of said backrest and further comprises channel means substantially conforming to the curvature of the seat-lumbar supporting surfaces and secured thereto at a plurality of load distributing points, said channel means including upper ends extending to the horizontal axis and adapted to pivotally receive said pivot means.

6. A seat in accordance with claim 5 wherein said channel means comprise a pair of channels one each on opposite sides of said seat, said channels of the pair further comprising fastening means attached thereto for receiving a passenger seat belt.

7. A seat in accordance with claim 4 and further comprising a food tray provided for a passenger seated behind said seat, said food tray being supported by arms pivotally connected to said pivotal connecting means.

8. A seat in accordance with claim 1 wherein said supporting means comprises at least two parallel support legs adapted for mounting to the floor of the vehicle and extending upwardly to said seat height, said support legs defining seat supporting members to be spanned by said rigid planar structure free of any frame member other than the planar honeycomb structure itself, which structure is frangible upon severe impact from a passenger seated behind the seat.

9. A seat in accordance with claim 8 wherein said support legs comprise Y-shaped saddles each having at the upper portion thereof a support surface substantially conforming to the shape of the planar structure defining the seat-lumbar supporting surfaces.

10. A seat in accordance with claim 9 wherein each of said support legs is formed of a planar structure comprising rigid outer skins separated by a honeycomb material.

11. A lightweight seat for passengers of vehicles adapted for airborne flight comprising:
    an integral seat-lumbar supporting surface and rigid seat-lumbar frame both commonly defined by a planar structure having rigid outer skins separated by a honeycomb material, said planar structure provides a substantially horizontal seat surface which integrally continues via an upward curve into a lumbar supporting surface, and the curved planar structure itself further provides a rigid frame of high torsional and bending rigidity to support the weight of a passenger seated on the seat-lumbar supporting surface thereof;
    a backrest surface extending upwardly from the lumbar supporting surface, said backrest surface being integrally formed with a backrest frame both commonly defined by a planar structure having rigid outer skins separated by honeycomb material; and
    means for supporting said integral seat-lumbar frame and supporting surface at seat height above the floor of the vehicle.

12. A lightweight seat for passengers of vehicles adapted for airborne flight comprised of:
    at least two parallel support legs adapted for mounting to a floor of the vehicle and extending upwardly to define seat supporting members to be spanned by a seat portion and a lumbar supporting portion;
    a planar structure spanning the space between said support legs free of frame members other than the frame integrally provided by the planar structure itself which is frangible upon severe impact from a passenger seated behind the seat, said planar structure having a substantially horizontal seat portion thereof integrally continuing via an upward curve into a lumbar supporting portion to provide high torsional and bending rigidity for the seat portion spanning said support legs, said planar structure and said support legs both comprising rigid outer skins separated by a honeycomb material.

13. A seat in accordance with claim 12 and further comprising:
  a backrest portion extending upwardly from the lumbar supporting surface, said backrest portion also comprising a planar structure having rigid outer skins separated by a honeycomb material.

References Cited

UNITED STATES PATENTS

| 2,959,207 | 11/1960 | Brewster | 297—216 |
| 3,000,020 | 9/1961 | Lombard et al. | 5—355 |
| 3,037,812 | 6/1962 | Monroe | 297—355 |
| 3,147,997 | 9/1964 | Mason | 297—457 |
| 3,164,110 | 1/1965 | Bofinger | 108—161 |
| 3,165,356 | 1/1965 | Geier et al. | 297—457 X |
| 3,222,109 | 12/1965 | Seward | 297—385 X |
| 3,385,642 | 5/1968 | Schreyer | 312—195 |
| 3,392,954 | 7/1968 | Malitte | 297—248 |

CASMIR A. NUNBERG, Primary Examiner

U.S. Cl. X.R.

244—122; 297—248, 355, 417, 457